(12) United States Patent
Liu

(10) Patent No.: US 11,984,929 B2
(45) Date of Patent: May 14, 2024

(54) METHOD FOR RECEIVING AND SENDING SIGNAL IN OPTICAL COMMUNICATION, OPTICAL TRANSCEIVER, AND SYSTEM

(71) Applicant: HUAWEI TECHNOLOGIES CO., LTD., Guangdong (CN)

(72) Inventor: Ling Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 17/550,665

(22) Filed: Dec. 14, 2021

(65) Prior Publication Data
US 2022/0103256 A1      Mar. 31, 2022

Related U.S. Application Data

(63) Continuation of application No. PCT/CN2020/092635, filed on May 27, 2020.

(30) Foreign Application Priority Data

Jun. 14, 2019    (CN) .......................... 201910516696.6

(51) Int. Cl.
| | | |
|---|---|---|
| *H04B 10/61* | (2013.01) | |
| *H04B 10/2569* | (2013.01) | |
| *H04J 14/06* | (2006.01) | |

(52) U.S. Cl.
CPC ....... *H04B 10/2569* (2013.01); *H04B 10/614* (2013.01); *H04J 14/06* (2013.01)

(58) Field of Classification Search
CPC ............................... H04B 10/614; H04J 14/06
See application file for complete search history.

(56) References Cited

U.S. PATENT DOCUMENTS

| | | | |
|---|---|---|---|
| 5,596,436 A | * | 1/1997 | Sargis ................ H04J 14/0298 398/76 |
| 9,716,564 B2 | * | 7/2017 | Schmogrow ............ H04J 14/06 |

(Continued)

FOREIGN PATENT DOCUMENTS

| | | |
|---|---|---|
| CN | 101803247 A | 8/2010 |
| CN | 201698046 U | 1/2011 |

(Continued)

OTHER PUBLICATIONS

Office Action issued in Chinese Application No. 201910516696.6 dated May 8, 2021, 13 pages (with English translation).

(Continued)

*Primary Examiner* — Tanya T Motsinger
(74) *Attorney, Agent, or Firm* — Fish & Richardson P.C.

(57) ABSTRACT

The present disclosure provides example method for sending a signal in optical communication, an example optical transmitter, and an example optical communication system. One example method for sending a signal in optical communication includes generating, by an optical transmitter, multiple first subcarriers based on a bit stream. State of polarization (SOP) rotation is performed by the optical transmitter on at least one subcarrier in the multiple first subcarriers to generate multiple second subcarriers, wherein the multiple second subcarriers comprise multiple subcarriers each with a relative SOP rotation angle, and the relative SOP rotation angle is not zero and is not an integer multiple of 90 degrees. The multiple second subcarriers are modulated to an optical signal. The modulated optical signal is sent by the optical transmitter.

20 Claims, 15 Drawing Sheets

(56) References Cited

U.S. PATENT DOCUMENTS

| | | | |
|---|---|---|---|
| 11,650,340 B2* | 5/2023 | Le | G01V 1/008 367/14 |
| 2013/0253896 A1 | 9/2013 | Vassilieva et al. | |
| 2013/0336654 A1 | 12/2013 | Arikawa et al. | |
| 2014/0186024 A1 | 7/2014 | Randel et al. | |
| 2014/0314415 A1* | 10/2014 | Vassilieva | H04J 14/0257 398/76 |
| 2014/0348506 A1* | 11/2014 | Nakamoto | H04B 10/294 398/65 |
| 2014/0363164 A1* | 12/2014 | Kim | H04B 10/2572 398/65 |
| 2017/0054513 A1* | 2/2017 | Guo | H04B 10/6164 |
| 2018/0176802 A1* | 6/2018 | Rosenhouse | H04B 14/008 |
| 2019/0033630 A1* | 1/2019 | Kim | G02F 1/0136 |
| 2019/0229838 A1* | 7/2019 | Liu | H04L 1/0047 |
| 2019/0253153 A1* | 8/2019 | Sun | H04J 14/06 |
| 2020/0092145 A1* | 3/2020 | Smaini | H04L 25/03159 |
| 2020/0393388 A1* | 12/2020 | Makuuchi | G01N 21/94 |
| 2022/0140994 A1* | 5/2022 | Yan | H04L 9/0852 380/263 |
| 2022/0278752 A1* | 9/2022 | Zhou | H04B 10/516 |
| 2022/0317058 A1* | 10/2022 | Yamamoto | G02B 21/0036 |
| 2023/0291120 A1* | 9/2023 | Okano | H01Q 1/1257 |

FOREIGN PATENT DOCUMENTS

| | | |
|---|---|---|
| CN | 102427386 A | 4/2012 |
| CN | 102439879 A | 5/2012 |
| CN | 105281862 A | 1/2016 |
| CN | 105635023 A | 6/2016 |
| CN | 107809282 A | 3/2018 |
| WO | 2016042535 A1 | 3/2016 |

OTHER PUBLICATIONS

Office Action issued in Chinese Application No. 201910516696.6 dated Nov. 16, 2021, 11 pages (with English translation).

Extended European Search Report issued in European Application No. 20822403.0 dated Jun. 15, 2022, 10 pages.

* cited by examiner

METHOD FOR RECEIVING AND SENDING SIGNAL IN OPTICAL COMMUNICATION, OPTICAL TRANSCEIVER, AND SYSTEM

CROSS-REFERENCE TO RELATED APPLICATIONS

This application is a continuation of International Application No. PCT/CN2020/092635, filed on May 27, 2020, which claims priority to Chinese Patent Application No. 201910516696.6, filed on Jun. 14, 2019. The disclosures of the aforementioned applications are hereby incorporated by reference in their entireties.

TECHNICAL FIELD

This application relates to the communication field, and in particular, to a method for receiving and sending a signal in optical communication, an optical transceiver, and a system.

BACKGROUND

With advances in a high-speed digital signal processing (DSP) technology and an analog-to-digital conversion technology, coherent optical communication has become a research hotspot. A coherent optical communication system supports a high-order modulation format and polarization multiplexing to achieve transmission of high spectral efficiency.

The polarization multiplexing is to use two orthogonal states of polarization of light to simultaneously transmit two independent orthogonal polarization signals in a same bandwidth, thereby doubling channel transmission efficiency. A combination of the polarization multiplexing and a coherent reception technology can implement long-distance transmission at more than 100 Gb/s. However, a birefringent effect is generated when an optical fiber is affected by an external environment, and a birefringent axis of the optical fiber changes randomly with time. After the two orthogonal polarization signals generated through the polarization multiplexing at a transmit end are transmitted through the optical fiber, system penalties are caused by a polarization-dependent loss (PDL) of the optical fiber. Consequently, system performance fluctuation is caused. In a common link design, a specific (optical signal-to-noise ratio, OSNR) margin needs to be reserved for the fluctuation to ensure that no bit error occurs after forward error correction (FEC) in the transmission system is performed. Generally, the PDL is 6 dB, and an OSNR margin of about 3 dB needs to be reserved. If the reserved OSNR is relatively large, a transmission distance of the communication system is reduced. Therefore, a problem of reducing the system performance fluctuation caused by the PDL needs to be resolved, to reduce the system penalties (the reserved OSNR margin) caused by the PDL.

SUMMARY

In view of this, this application provides a method for receiving and sending a signal in optical communication, an optical transceiver, and a system, to reduce performance fluctuation and system penalties caused by a PDL.

According to a first aspect, this application provides a method for sending a signal in optical communication. The method may include: An optical transmitter obtains a bit stream, distributes the obtained bit stream into at least two bit streams, and modulates each distributed bit stream into one subcarrier, to generate at least two first subcarriers. The optical transmitter performs state of polarization (SOP) rotation on one or more second subcarriers, so that at least two subcarriers with a relative SOP rotation angle exist, where the relative SOP rotation angle is not zero and is not an integer multiple of 90 degrees. After the SOP rotation is performed, the optical transmitter modulates the at least two first subcarriers to an optical signal, and sends the optical signal. The SOP rotation is performed on the second subcarrier, so that OSNR penalties of the subcarriers with the relative SOP rotation angle are averaged and cancelled, thereby reducing system performance fluctuation and system penalties caused by a PDL.

In a possible implementation, the relative SOP rotation angle is 45 degrees. When a relative SOP rotation angle between two subcarriers is 45 degrees, OSNR curves of the two subcarriers can be complementary, thereby reducing system performance fluctuation and system penalties. Certainly, the relative SOP rotation angle may alternatively be another angle, for example, 30 degrees, 135 degrees, or 225 degrees.

In a possible implementation, the SOP rotation includes: performing the SOP rotation on one second subcarrier in the first subcarrier according to the formula $$\begin{bmatrix} Xout \\ Yout \end{bmatrix} = \begin{bmatrix} \cos\alpha & \sin\alpha \\ -\sin\alpha & \cos\alpha \end{bmatrix} \begin{bmatrix} Xin \\ Yin \end{bmatrix},$$

where Xin and Yin indicate one second subcarrier obtained before the SOP rotation is performed, Xout and Yout indicate one second subcarrier obtained after the SOP rotation is performed, and α is an angle of the SOP rotation. When the SOP rotation is performed on a plurality of second subcarriers, the SOP rotation may be performed on each second subcarrier by using the foregoing formula.

In a possible implementation, after the SOP rotation is performed, the optical transmitter performs spectrum shifting on a first subcarrier obtained after the SOP rotation is performed. Alternatively, the optical transmitter performs spectrum shifting on the generated first subcarrier before the SOP rotation is performed. An objective of the spectrum shifting is to enable a receive end to separate the at least two first subcarriers, and the spectrum shifting only needs to be implemented before the first subcarriers are multiplexed.

In a possible implementation, the optical transmitter multiplexes the first subcarrier obtained after the SOP rotation is performed and a first subcarrier obtained after the spectrum shifting is performed. After the first subcarriers are multiplexed and a multiplexed first subcarrier is output, the first subcarrier may be modulated to the optical signal, and is carried and sent by using the optical signal.

According to a second aspect, this application provides an optical transmitter, where the optical transmitter includes a digital signal processor DSP and a modulator. The DSP obtains a bit stream, distributes the obtained bit stream into at least two bit streams, and modulates each distributed bit stream to one subcarrier, to generate at least two first subcarriers. The DSP performs state of polarization SOP rotation on one or more second subcarriers, so that at least two subcarriers with a relative SOP rotation angle exist, where the relative SOP rotation angle is not zero and is not an integer multiple of 90 degrees. After the SOP rotation is performed, the modulator modulates the at least two first subcarriers to an optical signal, and sends the optical signal. The SOP rotation is performed on the second subcarrier, so that OSNR penalties of the subcarriers with the relative SOP rotation angle are averaged and cancelled, thereby reducing system performance fluctuation and system penalties caused by a PDL.

In a possible implementation, the relative SOP rotation angle is 45 degrees. When a relative SOP rotation angle between two subcarriers is 45 degrees, OSNR curves of the two subcarriers can be complementary, thereby reducing system performance fluctuation and system penalties. Certainly, the relative SOP rotation angle may alternatively be another angle, for example, 30 degrees, 135 degrees, or 225 degrees.

In a possible implementation, the DSP performs the SOP rotation on one second subcarrier according to the formula $$\begin{bmatrix} Xout \\ Yout \end{bmatrix} = \begin{bmatrix} \cos\alpha & \sin\alpha \\ -\sin\alpha & \cos\alpha \end{bmatrix} \begin{bmatrix} Xin \\ Yin \end{bmatrix},$$

where Xin and Yin indicate one second subcarrier obtained before the SOP rotation is performed, Xout and Yout indicate one second subcarrier obtained after the SOP rotation is performed, and a is an angle of the SOP rotation. When the SOP rotation is performed on a plurality of second subcarriers, the SOP rotation may be performed on each second subcarrier by using the foregoing formula.

In a possible implementation, the DSP is further configured to: after the SOP rotation is performed, perform spectrum shifting on a first subcarrier obtained after the SOP rotation is performed. Alternatively, the DSP is further configured to perform spectrum shifting on the obtained first subcarrier before the SOP rotation is performed. An objective of the spectrum shifting is to enable a receive end to separate the at least two first subcarriers, and the spectrum shifting only needs to be implemented before the first subcarriers are multiplexed.

In a possible implementation, the DSP is further configured to multiplex the first subcarrier obtained after the SOP rotation is performed and a first subcarrier obtained after the spectrum shifting is performed. After the first subcarriers are multiplexed and a multiplexed first subcarrier is output, the first subcarrier may be modulated to the optical signal, and is carried and sent by using the optical signal.

According to a third aspect, this application provides a method for receiving a signal in optical communication. The method may include: An optical receiver receives an optical signal, and converts the optical signal into an electrical signal, where the electrical signal includes a first signal and a second signal, and the first signal and the second signal correspond to different states of polarization. The optical receiver generates a first coefficient, a second coefficient, and a third coefficient, filters the first signal based on the first coefficient to obtain a third signal, filters the second signal based on the second coefficient to obtain a fourth signal, and filters the second signal based on the third coefficient to obtain a fifth signal. The optical receiver sums the third signal and the fourth signal to obtain a seventh signal, and obtains decision sequences of the first signal and the second signal based on the fifth signal and the seventh signal. The first signal and the second signal may be two orthogonal polarization signals. For example, the first signal is in an X state of polarization, and the second signal is in a Y state of polarization. The optical receiver performs joint detection by using signals in different states of polarization, so that system penalties caused by a PDL can be reduced and performance can be improved.

In a possible implementation, the first signal and the second signal each have at least two subcarriers, and a relative state of polarization SOP rotation angle between the at least two subcarriers is not zero and is not an integer multiple of 90 degrees, so that the third coefficient is not zero. In a dual-subcarrier scenario, a relative SOP rotation angle between two subcarriers causes filtering coefficients between signals in different states of polarization to be non-zero, to implement joint detection between the signals in different states of polarization.

In a possible implementation, the obtaining decision sequences of the first signal and the second signal includes: obtaining the decision sequences of the first signal and the second signal by minimizing a cost function.

According to a fourth aspect, this application provides an optical receiver, including an optical receiver front end and a DSP. The optical receiver front end may include a frequency mixer, a balanced receiver, and the like, and may be configured for optical-to-electrical conversion. The optical receiver front end receives an optical signal, and converts the optical signal into an electrical signal, where the electrical signal includes a first signal and a second signal, and the first signal and the second signal correspond to different states of polarization. The DSP generates a first coefficient, a second coefficient, and a third coefficient, filters the first signal based on the first coefficient to obtain a third signal, filters the second signal based on the second coefficient to obtain a fourth signal, and filters the second signal based on the third coefficient to obtain a fifth signal. The DSP sums the third signal and the fourth signal to obtain a seventh signal, and obtains decision sequences of the first signal and the second signal based on the fifth signal and the seventh signal. The first signal and the second signal may be two orthogonal polarization signals. For example, the first signal is in an X state of polarization, and the second signal is in a Y state of polarization. The optical receiver performs joint detection by using signals in different states of polarization, so that system penalties caused by a PDL can be reduced and performance can be improved.

In a possible implementation, the first signal and the second signal each have at least two subcarriers, and a relative state of polarization SOP rotation angle between the at least two subcarriers is not zero and is not an integer multiple of 90 degrees, so that the third coefficient is not zero. In a dual-subcarrier scenario, a relative SOP rotation angle between two subcarriers causes filtering coefficients between signals in different states of polarization to be non-zero, to implement joint detection between the signals in different states of polarization.

In a possible implementation, the DSP is configured to obtain the decision sequences of the first signal and the second signal by minimizing a cost function.

According to a fifth aspect, this application provides an optical communication system. The optical communication system includes the optical transmitter according to any one of the second aspect or the possible implementations of the second aspect, and/or the optical receiver according to any one of the fourth aspect or the possible implementations of the fourth aspect.

Still another aspect of this application provides a readable storage medium. The readable storage medium stores instructions, and when the instructions are run on an optical transceiver, the optical transceiver is enabled to perform the methods in the foregoing aspects.

Still another aspect of this application provides a program product including instructions. When the program product runs on an optical transceiver, the optical transceiver is enabled to perform the methods in the foregoing aspects.

BRIEF DESCRIPTION OF DRAWINGS

To describe technical solutions in embodiments of the present invention, the following briefly describes accompanying drawings used to describe the embodiments.

DESCRIPTION OF EMBODIMENTS

The following further describes the present invention in detail with reference to accompanying drawings and embodiments.

Figure 1:
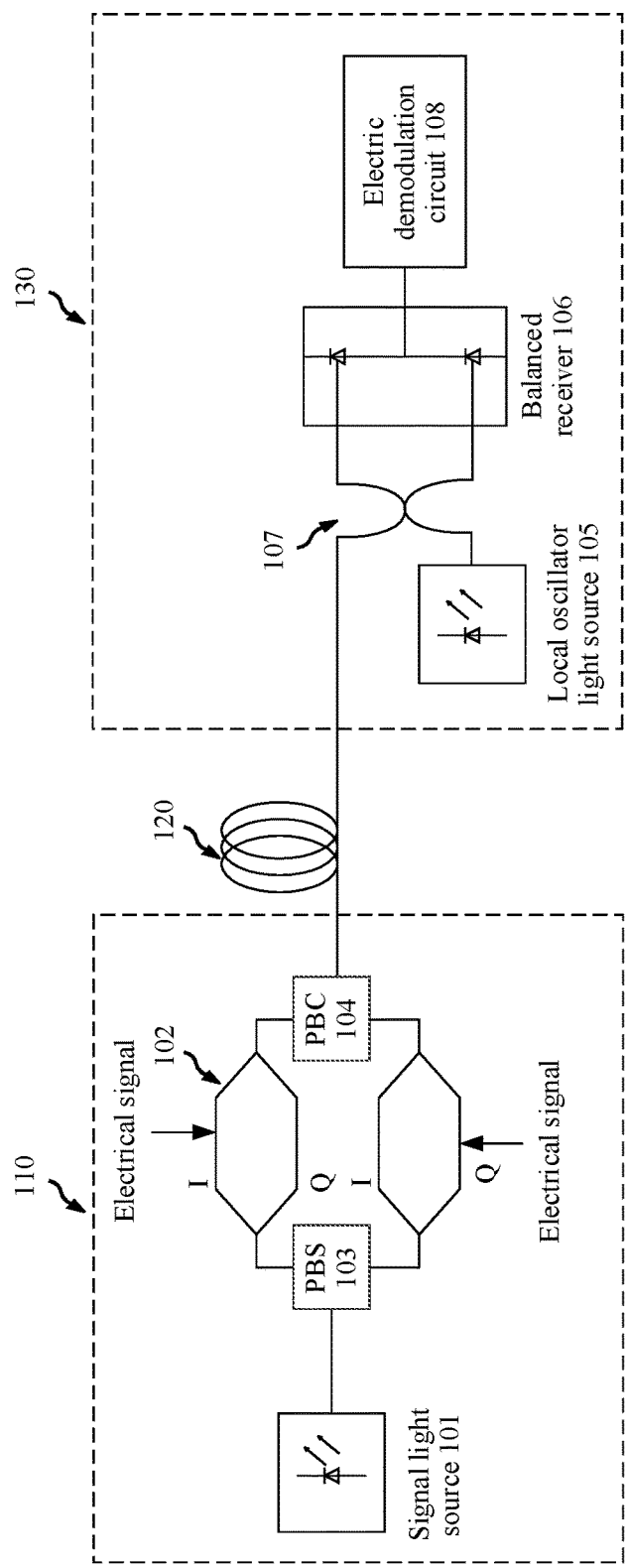
FIG. 1 is a schematic structural diagram of a coherent optical communication system according to an embodiment of the present invention.

Technical solutions in the embodiments of the present invention may be applied to a plurality of types of optical communication systems, such as a coherent optical communication system, a direct detection optical communication system, and other communication systems that may implement the technical solutions of the present invention. In the embodiments of the present invention, the coherent optical communication system is used as an example for description. FIG. 1 is a schematic structural diagram of a coherent optical communication system according to an embodiment of the present invention. The coherent optical communication system includes a transmit end 110, an optical fiber 120, and a receive end 130. The transmit end 110 may include a signal light source 101, a modulator 102, a polarization beam splitter (PBS) 103, and a polarization beam combiner (PBC) 104. The transmit end 110 may further include a digital signal processor (DSP) or a digital signal processing chip, and is configured to generate an electrical signal. The receive end 130 may include a local oscillator light source 105, a balanced receiver 106, a PBS (not shown in the figure), a frequency mixer 107, and an electric demodulation circuit 108. The electric demodulation circuit 108 may include a DSP or a digital signal processing chip. The transmit end and the receive end may be on a same device, or may be on different devices. The technical solutions in the embodiments of the present invention may be applied to a coherent optical communication system that supports polarization multiplexing, or may be applied to a coherent optical communication system of another form, for example, a coherent optical communication system that uses a single state of polarization. The coherent optical communication system that uses the single state of polarization may not have a PBS or a PBC.

At the transmit end 110, the signal light source 101 may be a laser. An optical signal emitted by the signal light source 101 is divided into an optical signal X and an optical signal Y by using the polarization beam splitter 103. The modulator 102 loads one electrical signal to the optical signal X, and loads the other electrical signal to the optical signal Y The electrical signal may be obtained after the DSP at the transmit end (TxDSP) performs one or more processing such as FEC, constellation mapping, and pulse shaping, on a message bit stream. The modulator 102 may be an I/Q modulator, each electrical signal includes a signal I and a signal Q, and a phase difference between the signal I and the signal Q is 90 degrees. After the electrical signals pass through the modulator 102, four signals are formed: XI, XQ, YI, and YQ. Then, the optical signal X and the optical signal Y modulated with the electrical signals are multiplexed by using the polarization beam combiner 104. Then, a multiplexed signal is sent through the optical fiber 120.

After the receive end 130 receives the optical signal transmitted through the optical fiber 120, the polarization beam splitter splits the received optical signal into two orthogonal signals, where frequency mixing 107 is performed between each orthogonal signal and one optical signal generated by the local oscillator light source 105. The local oscillator light source 105 may be a laser. Four optical signals XI, XQ, YI, and YQ whose polarization and phases are orthogonal are obtained after the frequency mixing is performed. Then, the balanced receiver 106 converts the optical signals into analog electrical signals, and an analog-to-digital conversion circuit converts the analog electrical signals into four digital electrical signals. The DSP at the receive end (RxDSP) perform one or more processing such as dispersion compensation, polarization demultiplexing, equalization, and decoding on the digital electrical signals.

Figure 2:
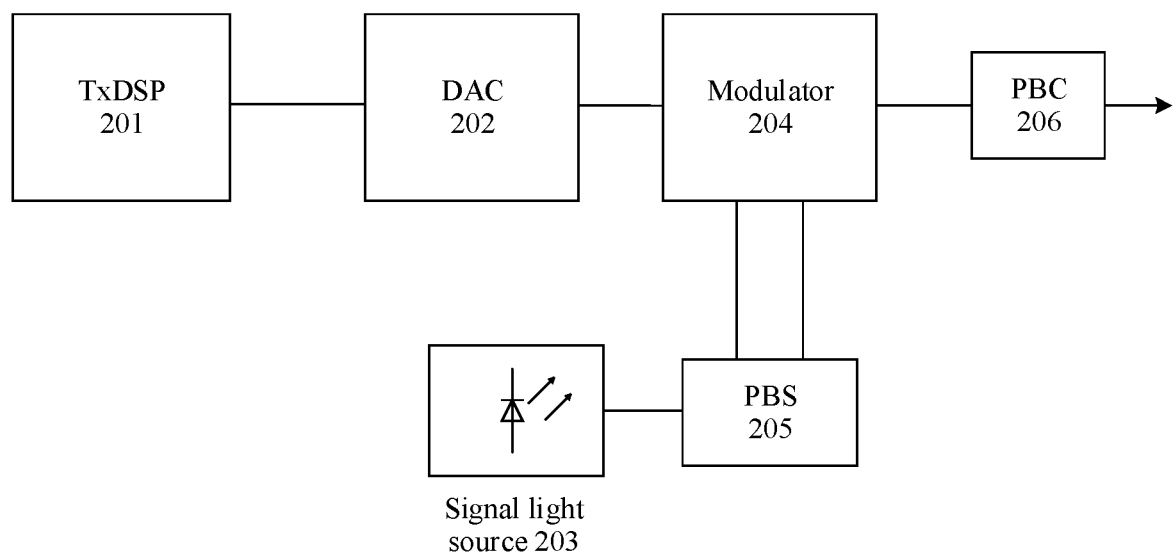
FIG. 2 is a schematic structural diagram of an optical transmitter according to an embodiment of the present invention.

FIG. 2 is a schematic structural diagram of an optical transmitter according to an embodiment of the present invention. The optical transmitter may include a DSP at a transmit end (TxDSP) 201, a digital-to-analog converter (DAC) 202, a signal light source 203, a modulator 204, a polarization beam splitter (PBS) 205, a polarization beam combiner (PBC) 206, and the like. The TxDSP 201 may include one or more functional modules configured to perform FEC, constellation mapping, pulse shaping, state of polarization (SOP) rotation, and spectrum shifting. The functional modules on the TxDSP may be implemented based on hardware, or may be implemented based on software, or may be implemented in combination with hardware and software. For example, the TxDSP may be implemented by using an application-specific integrated circuit (ASIC), a field-programmable gate array (FPGA), or a digital logic circuit. For another example, the TxDSP may include a processor and a memory. The processor implements functions of the one or more functional modules by running program code stored in the memory. For another example, the TxDSP may have no function of storing program code, and has only a function of a processor. For a working principle of the optical transmitter, refer to the descriptions of the transmit end in the embodiment in FIG. 1.

Figure 3A:
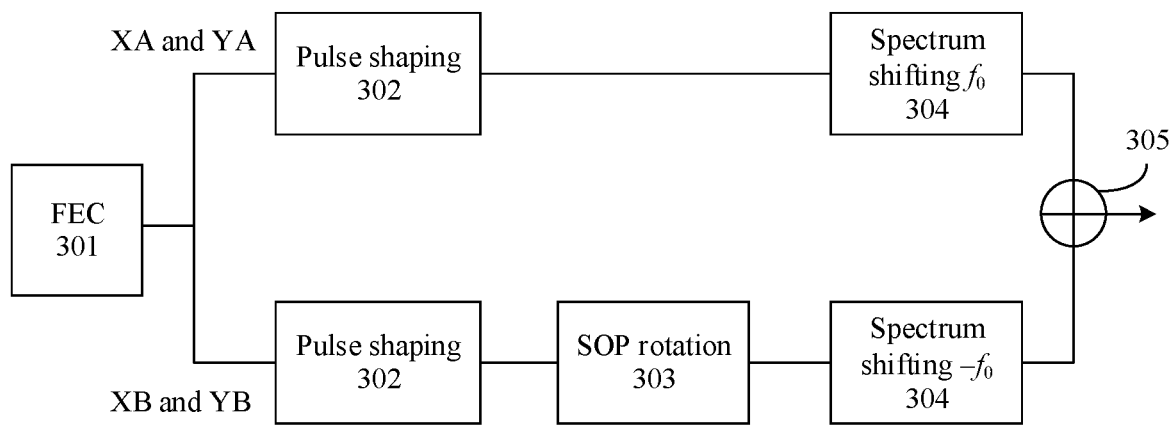
FIG. 3a is a schematic diagram of a logical structure of a TxDSP according to an embodiment of the present invention.
Figure 3B:
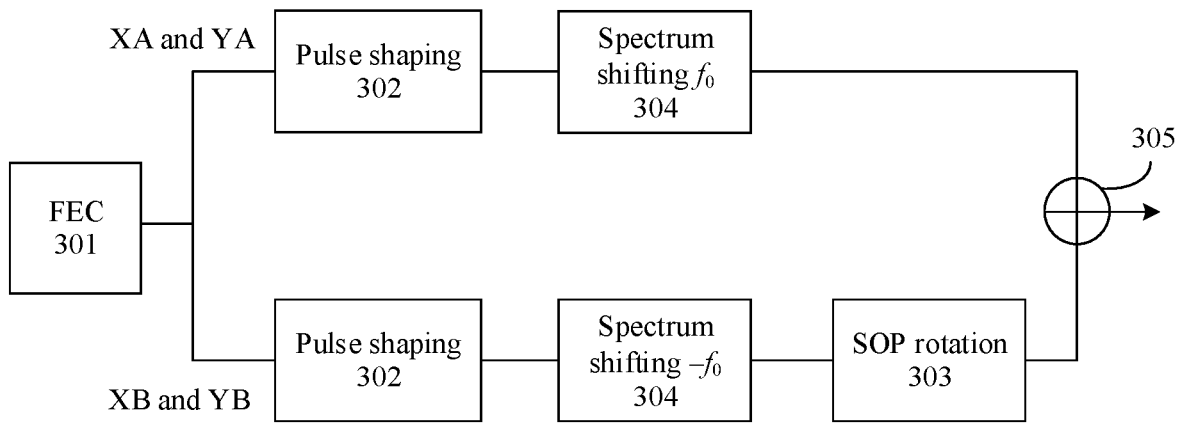
FIG. 3b is a schematic diagram of a logical structure of a TxDSP according to an embodiment of the present invention.

FIG. 3a is a schematic diagram of a logical structure of a TxDSP according to an embodiment of the present invention. The TxDSP may include forward error correction (FEC) 301, pulse shaping 302, SOP rotation 303, spectrum shifting 304, and a combiner 305. FIG. 3b is a schematic diagram of a logical structure of a TxDSP according to an embodiment of the present invention. A difference between FIG. 3b and FIG. 3a lies in that the spectrum shifting 304 may be performed before the SOP rotation 303.

FIG. 3a is used as an example for description. The FEC 301 obtains a binary bit stream. The binary bit stream may be an electrical signal generated locally by a device, or may be an electrical signal received from an external device. The FEC 301 distributes the obtained binary bit stream into two bit streams, and the distributed two bit streams are modulated to two subcarriers by using the pulse shaping 302, including a subcarrier A and a subcarrier B. The subcarrier may also be an electrical signal. The subcarrier A includes XA and YA, and the subcarrier B includes XB and YB. After the pulse shaping 302 is performed, to enable the two subcarriers form a relative state of polarization (SOP) rotation angle, the SOP rotation 303 may be performed on any one of the subcarriers. For example, 45-degree SOP rotation is performed on the subcarrier B by using the following expression (1), so that there is an SOP rotation angle of 45 degrees between the subcarrier A and the subcarrier B. Certainly, the SOP rotation may alternatively be performed on the two subcarriers at the same time, so that the relative SOP rotation angle is formed between the two subcarriers. The SOP rotation angle may alternatively be any other angle, for example, 30 degrees, 135 degrees, 225 degrees, or 315 degrees, but the SOP rotation angle is not zero and is not an integer multiple of 90 degrees.

$$\begin{bmatrix} Xout \\ Yout \end{bmatrix} = \begin{bmatrix} \cos\frac{\pi}{4} & \sin\frac{\pi}{4} \\ -\sin\frac{\pi}{4} & \cos\frac{\pi}{4} \end{bmatrix} \begin{bmatrix} Xin \\ Yin \end{bmatrix}, \quad (1)$$

where

Xin and Yin indicate an input signal before the SOP rotation is performed, and Xout and Yout indicate an output signal after the SOP rotation is performed.

Figure 4:
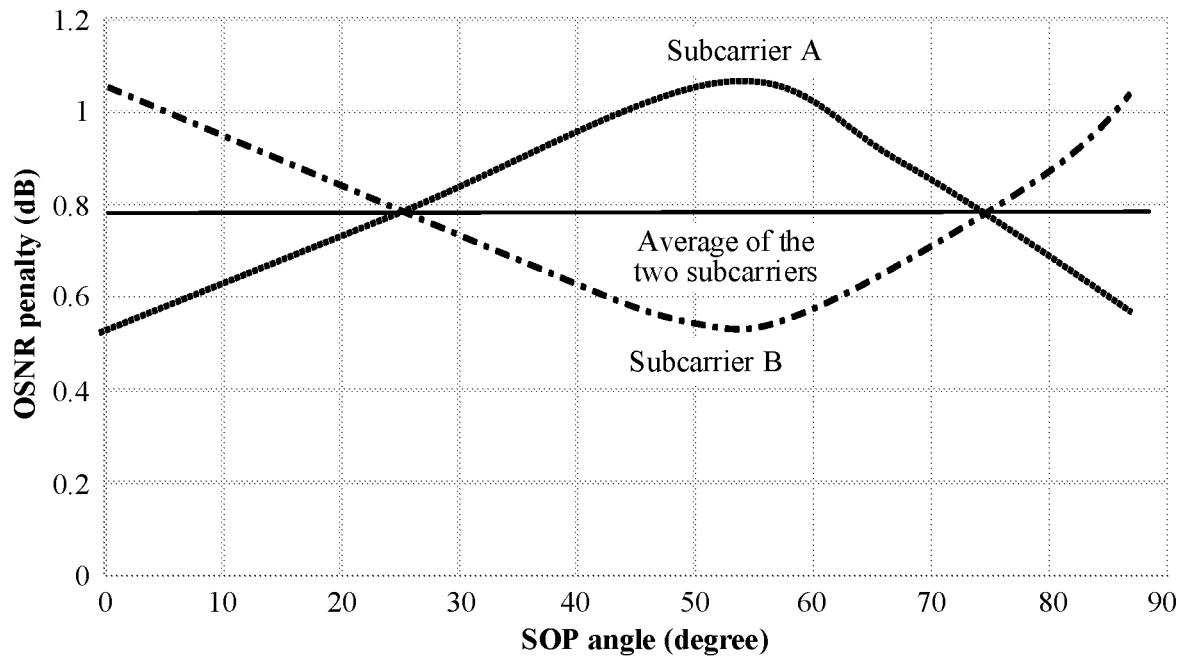
FIG. 4 is a schematic diagram of a curve in which an OSNR penalty changes with an SOP angle according to an embodiment of the present invention.

An SOP refers to a vibration direction of a photon of an optical signal, and the vibration direction of the photon is generally perpendicular to a propagation direction of the optical signal. For example, the optical signal is divided into optical signals in states of polarization X and Y that are perpendicular to each other by using a polarization beam splitter. An angle of a main axis of an optical fiber changes randomly with an environment, causing a signal SOP to change randomly relative to the main axis of the optical fiber. Different signal SOPs result in different PDL penalties. For example, a PDL penalty changes with an SOP angle. FIG. 4 is a schematic diagram of a curve in which an OSNR penalty changes with an SOP angle according to an embodiment of the present invention. As shown in FIG. 4, an OSNR penalty of a single subcarrier (as shown by any dashed line in FIG. 4) changes with an SOP angle, resulting in system performance fluctuation. After the 45-degree SOP rotation is performed, OSNR penalty curves of the subcarrier A and the subcarrier B are just complementary, in other words, the two subcarriers cannot work in a worst SOP at the same time. An average OSNR penalty curve (as shown by a solid line in FIG. 4) of the two subcarriers is smoother than a curve of the single subcarrier, and a maximum OSNR penalty value is reduced. It can be learned that, through the SOP rotation of the subcarrier, the system performance fluctuation can be reduced, and an OSNR margin reserved by a system for a PDL can be reduced. When the SOP rotation angle between the two subcarriers is not 45 degrees, the OSNR penalty curves of the two subcarriers may not be completely complementary, but OSNR penalty cancellation can be implemented as long as the OSNR penalty curves of the two subcarriers do not completely overlap.

The solution in this embodiment of the present invention is not limited to a dual-subcarrier solution, and may be further applied to a solution of three or more subcarriers as long as it is ensured that at least two subcarriers have a relative SOP rotation angle. For example, in a case of three subcarriers, the FEC distributes a bit stream into three bit streams, and modulates the three bit streams into three subcarriers. The SOP rotation may be performed on one of the subcarriers, or the SOP rotation may be performed on two or three of the subcarriers. When the SOP rotation is performed on a plurality of subcarriers, the SOP rotation may be performed on each subcarrier by using the foregoing formula (1). In an example, the SOP rotation is performed on the subcarrier A, so that there is a relative SOP rotation angle between the subcarrier A and the subcarrier B, there is a relative SOP rotation angle between the subcarrier A and a subcarrier C, and there is no relative SOP rotation angle between the subcarrier B and the subcarrier C. The SOP rotation may alternatively be performed on the subcarrier A and the subcarrier B, so that there is the relative SOP rotation angle between the subcarrier A and the subcarrier B, there is the relative SOP rotation angle between the subcarrier A and the subcarrier C, and there is the relative SOP rotation angle between the subcarrier B and the subcarrier C. In addition, the technical solution in this embodiment of the present invention is not limited to a polarization multiplexing scenario, and is also applicable to a single state of polarization scenario. In the scenario of a single state of polarization, the two subcarriers output by the FEC may include only one state of polarization, the subcarrier A may include XA or YA, and the subcarrier B may include XB or YB.

Figure 5:
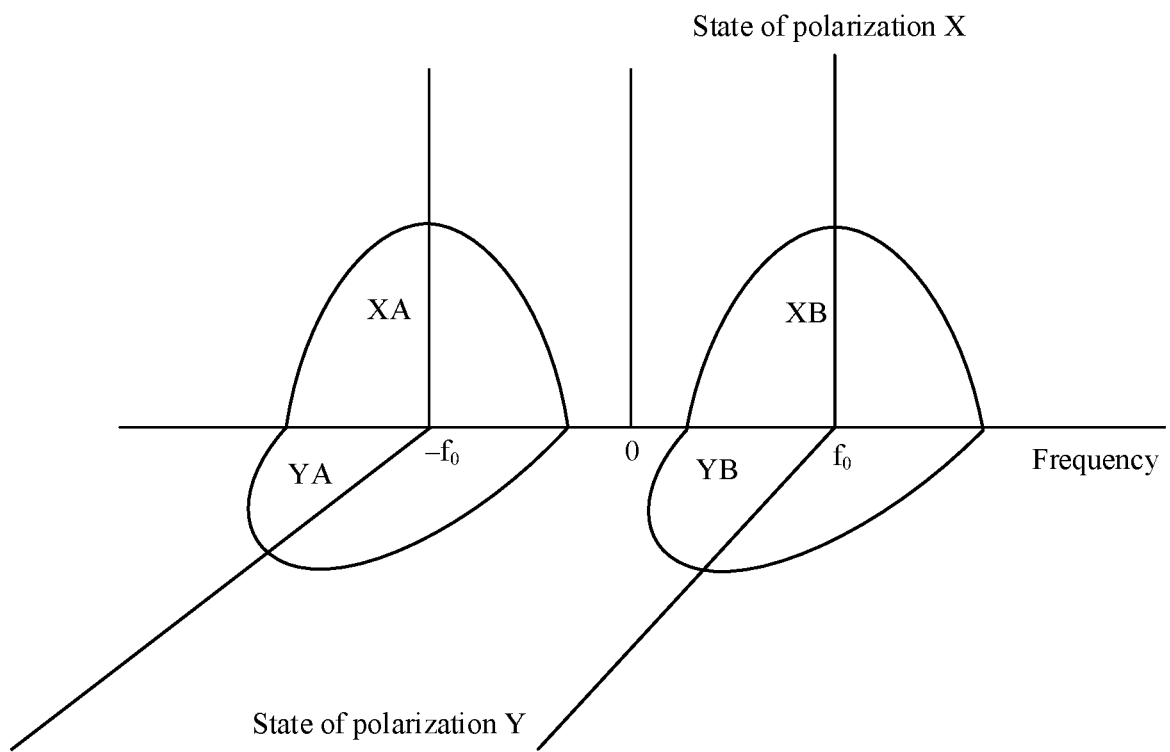
FIG. 5 is a schematic diagram of a subcarrier spectrum according to an embodiment of the present invention.

FIG. 5 is a schematic diagram of a subcarrier spectrum according to an embodiment of the present invention. After the SOP rotation 303 is performed, the spectrum shifting 304 is separately performed on the two subcarriers, and a spectrum diagram of subcarriers obtained after the spectrum shifting is performed is shown in FIG. 5. The spectrum shifting 304 may be implemented by using a frequency shifter, to change spectrum locations of the subcarriers. For example, the subcarriers XA and YA are multiplied by a coefficient exp (−j2 πf0t), and are shifted from a zero frequency to a frequency −$f_0$. The subcarriers XB and YB are multiplied by a coefficient exp (j2 πf0t), and are shifted from the zero frequency to a frequency f0. In addition to zero-frequency shifting, shifting may alternatively be performed based on another frequency. This is not limited in the present invention. An objective of the spectrum shifting is to shift the two subcarriers to different frequencies, to facilitate separation at a receive end. For three or more subcarriers, each subcarrier may be shifted to a different frequency.

After the spectrum shifting 304 is performed, the two subcarriers pass through the combiner 305 and generate electrically modulated signals XI, XQ, YI, and YQ. The combiner 305 may be implemented by using an adder. The electrically modulated signals are loaded onto an optical signal by using the modulator 204, for example, an I/Q modulator, and then the optical signal is sent by using an optical fiber.

Figure 6:
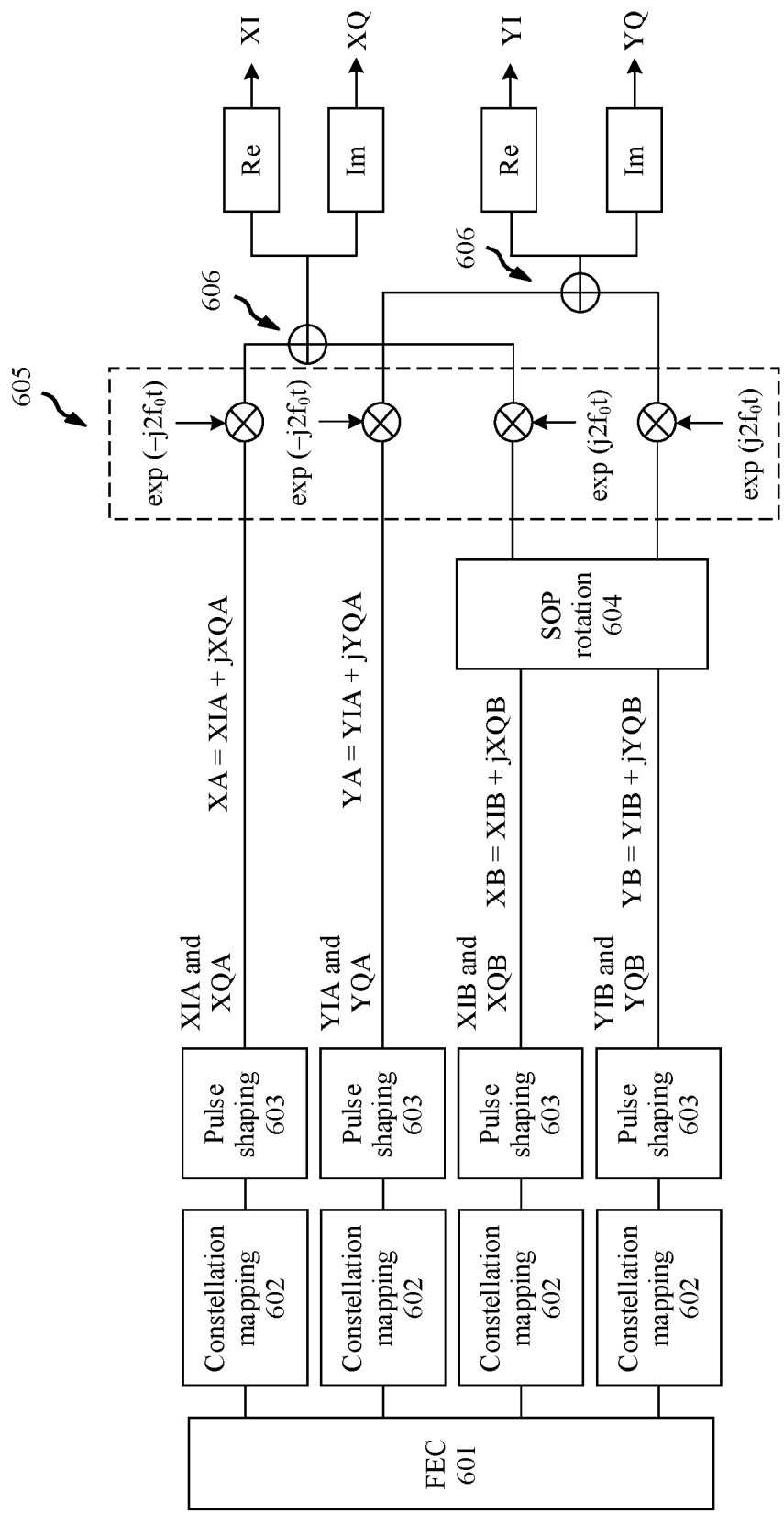
FIG. 6 is a schematic diagram of a logical structure of a TxDSP according to an embodiment of the present invention.

FIG. 6 is a schematic diagram of a logical structure of a TxDSP according to an embodiment of the present invention. The TxDSP may include FEC 601, constellation mapping 602, pulse shaping 603, SOP rotation 604, a spectrum shifting 605, and a combiner 606. Functions of the FEC, the pulse shaping, SOP rotation, the spectrum shifting, and the combiner in FIG. 6 are similar to those in FIG. 3a and FIG. 3b. The FEC 601 distributes an obtained binary bit stream into four bit streams, and the distributed four bit streams are modulated to two subcarriers by using the constellation mapping 602 and the pulse shaping 603. The two subcarriers include a subcarrier A and a subcarrier B, and the subcarrier may be an electrical signal. The subcarrier A includes XA and YA, and the subcarrier B includes XB and YB. The four bit streams are respectively modulated to the subcarriers XA, YA, XB, and YB. The constellation mapping 602 may map the binary bit stream to a constellation point in a modulation format, for example, quadrature phase shift keying (QPSK) or quadrature amplitude modulation (QAM) (for example, 8QAM, 16QAM, or 256QAM). The pulse shaping 603 may convert a constellation data stream of one sampling rate into another suitable waveform, for example, a raised cosine waveform. After the constellation mapping 602 and the pulse shaping 603 are performed, the subcarriers XA and YA each may include two signals: I and Q, and the subcarriers XB and YB each may include two signals: I and Q. That is, there are eight signal components: XIA, XQA, YIA, YQA, XIB, XQB, YIB and YQB. The subcarrier XA may be represented as XA=XIA+jXQA, and the subcarrier YA may be represented as YA=YIA+jYQA. The subcarrier XB may be represented as XB=XIB+jXQB, and the subcarrier YB may be represented as YB=YIB+jYQB.

To enable the two subcarriers to form a relative SOP rotation angle, the SOP rotation 604 may be performed on one or two of the subcarriers in a manner similar to the formula (1). After the SOP rotation 604 is performed, the spectrum shifting 605 is separately performed on the subcarrier A and the subcarrier B. A spectrum diagram of subcarriers obtained after the spectrum shifting is performed is shown in FIG. 5. The spectrum shifting 605 may be implemented by using a frequency shifter, to change spectrum locations of the subcarriers. For example, the subcarriers XA and YA are multiplied by a coefficient exp (−j2 πf0t), and are shifted from a zero frequency to a frequency −$f_0$. The subcarriers XB and YB are multiplied by a coefficient exp (j2 πf0t), and are shifted from the zero frequency to a frequency $f_0$. In addition to zero-frequency shifting, shifting may alternatively be performed based on another frequency. This is not limited in the present invention. An objective of the spectrum shifting is to shift the two subcarriers to different frequencies, to facilitate separation at a receive end. For three or more subcarriers, each subcarrier may be shifted to a different frequency. In addition, the spectrum shifting 605 may alternatively be performed before the SOP rotation 604.

After the spectrum shifting 605 is performed, the combiner 606 generates electrically modulated signals XI and XQ for the subcarriers XA and XB, and the combiner 606 generates electrically modulated signals YI and YQ for the subcarriers YA and YB. The combiner 606 may be implemented by using an adder. The electrically modulated signals XI, XQ, YI, and YQ are loaded onto an optical signal by using the modulator 204, for example, an I/Q modulator, and then the optical signal is sent by using an optical fiber.

In this embodiment of the present invention, after the SOP rotation is performed on the subcarrier, an obtained OSNR penalty curve is smoother (as shown in FIG. 4), thereby reducing system performance fluctuation. In addition, a maximum OSNR penalty value is reduced, thereby reducing an OSNR margin reserved for a PDL.

Figure 7:
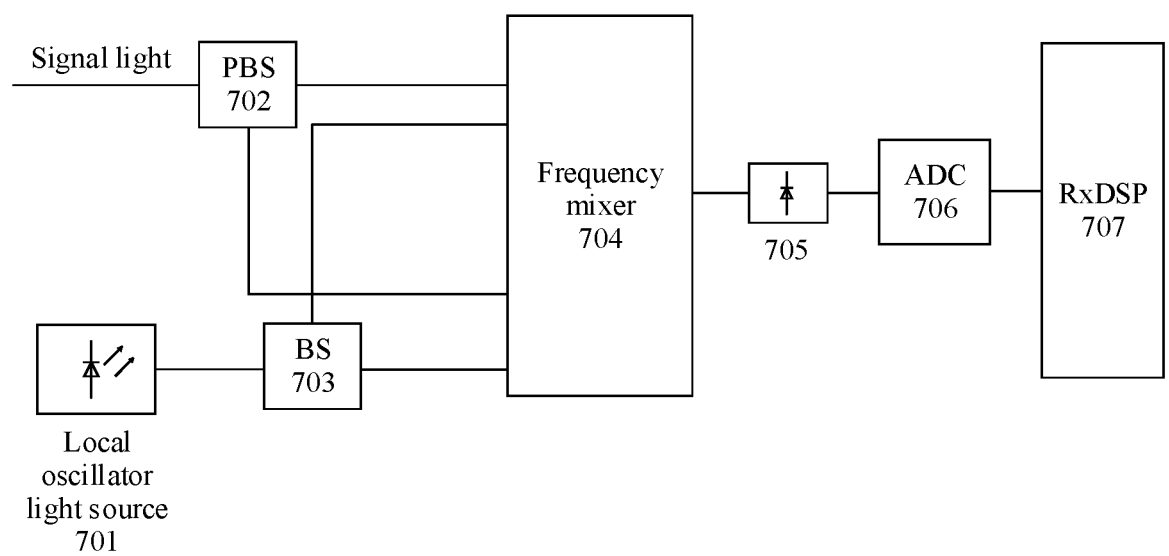
FIG. 7 is a schematic structural diagram of an optical receiver according to an embodiment of the present invention.

FIG. 7 is a schematic structural diagram of an optical receiver according to an embodiment of the present invention. The optical receiver may include a local oscillator light source 701, a polarization beam splitter (PBS) 702, a beam splitter (BS) 703, a frequency mixer 704, a balanced receiver 705, an analog-to-digital converter (ADC) 706, and a DSP at a receive end (RxDSP) 707. The RxDSP 707 may include one or more functional modules configured to perform dispersion compensation, equalization, polarization demultiplexing, phase recovery, and FEC. The functional modules on the RxDSP may be implemented based on hardware, or may be implemented based on software, or may be implemented in combination with hardware and software. For example, the RxDSP may be implemented by using an ASIC, an FPGA, or a digital logic circuit. For another example, the RxDSP may include a processor and a memory. The processor implements functions of the one or more functional modules by running program code stored in the memory. For another example, the RxDSP may have no function of storing program code, and has only a function of a processor. For a working principle of the optical transmitter, refer to the descriptions of the transmit end in the embodiment in FIG. 1. For a principle of the optical receiver, refer to the descriptions of the receive end in the embodiment in FIG. 1.

Figure 8A:
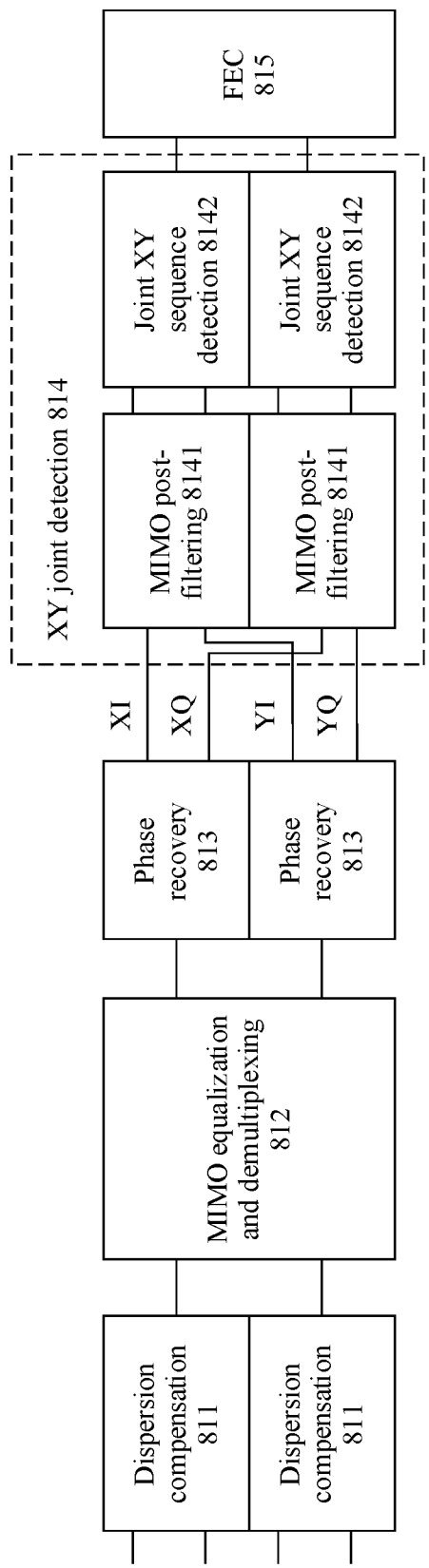
FIG. 8a is a schematic diagram of a logical structure of an RxDSP according to an embodiment of the present invention.

FIG. 8a is a schematic diagram of a logical structure of an RxDSP according to an embodiment of the present invention. As shown in FIG. 8a, the RxDSP may include dispersion compensation 811, multiple-input multi-output (MIMO) equalization and demultiplexing 812, phase recovery 813, XY joint detection 814, and FEC 815. After a signal light is received by an optical receiver, the signal light is coherently detected with a local oscillator light to obtain analog electrical signals, and the analog electrical signals are converted into digital electrical signals, for example, XI, XQ, YI, and YQ, by using an analog-to-digital converter. After the digital electrical signals XI, XQ, YI, and YQ are input to the RxDSP, the dispersion compensation 811 and the MIMO equalization and demultiplexing 812 are performed. The dispersion compensation 811 may use frequency domain equalization with a fixed coefficient to compensate for most dispersion in a link. The MIMO equalization and demultiplexing 812 may be implemented by using a 2×2 (a scenario of a dual state of polarization) or a 2×1 (a scenario of a single state of polarization) butterfly-shaped filter. A filtering coefficient is adaptively updated, so that a state of polarization change in the link is tracked, demultiplexing is completed, and other residual impairments in a system are compensated. A signal output by the MIMO equalization and demultiplexing 812 recovers a phase of the signal through the phase recovery 813. Due to influence of a PDL, crosstalk exists between signals in different states of polarization X and Y after the MIMO equalization is performed. Therefore, the XY joint detection 814 is required to further reduce system penalties caused by the signal crosstalk. The XY joint detection 814 may include two groups of MIMO post-filtering 8141 and joint XY sequence detection 8142, and is used to separately process I and Q signals. One group of MIMO post-filtering and joint XY sequence detection jointly detect XI and YI, and the other group of MIMO post-filtering and joint XY sequence detection jointly detect XQ and YQ. A signal that has undergone the XY joint detection 814 enters the FEC 815 for decoding.

Figure 8B:
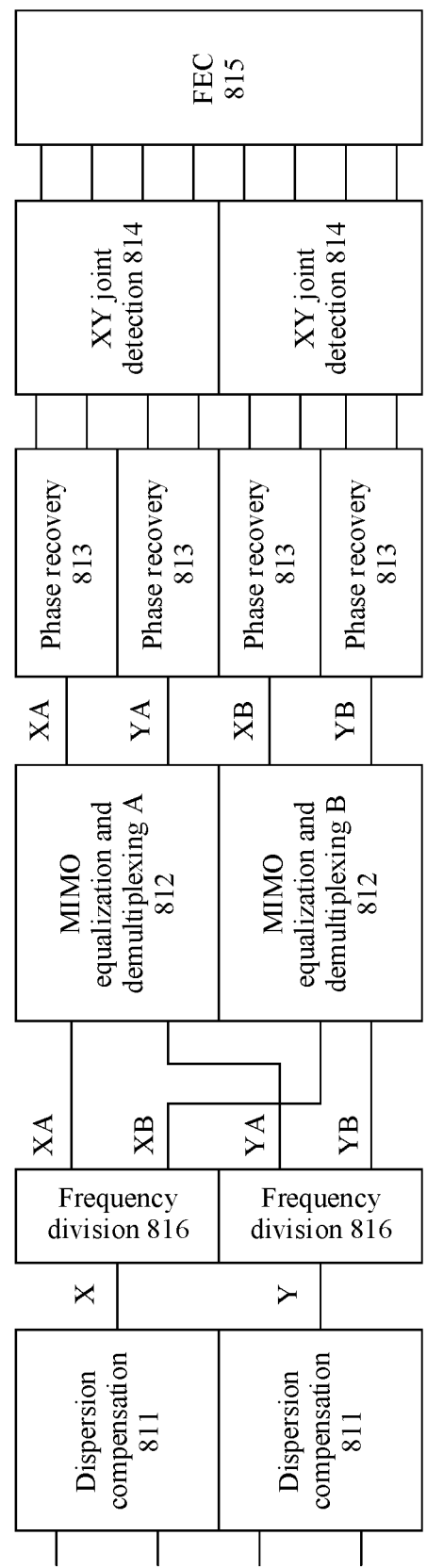
FIG. 8b is a schematic diagram of a logical structure of an RxDSP according to an embodiment of the present invention.

A technical solution in the embodiment in FIG. 8a may be applied to an optical communication system of a single subcarrier, and may be further applied to an optical communication system of two subcarriers or three or more subcarriers. FIG. 8b is a schematic diagram of a logical structure of an RxDSP according to an embodiment of the present invention. Two subcarriers are used as an example for description. A difference between FIG. 8b and FIG. 8a lies in that a signal obtained after the dispersion compensation 811 is performed is separated into two subcarrier signals, namely, a subcarrier A and a subcarrier B, by using a frequency divider 816. The subcarrier A may include subcarriers XA and YA, and the subcarrier B may include subcarriers XB and YB. The two subcarrier signals are separately processed in a manner similar to FIG. 8a, and processed by using two groups of MIMO equalization and demultiplexing 812, phase recovery 813, and XY joint detection 814 similar to those in FIG. 8a. Finally, the two subcarriers simultaneously enter the FEC 815 for decoding.

Figure 9A:
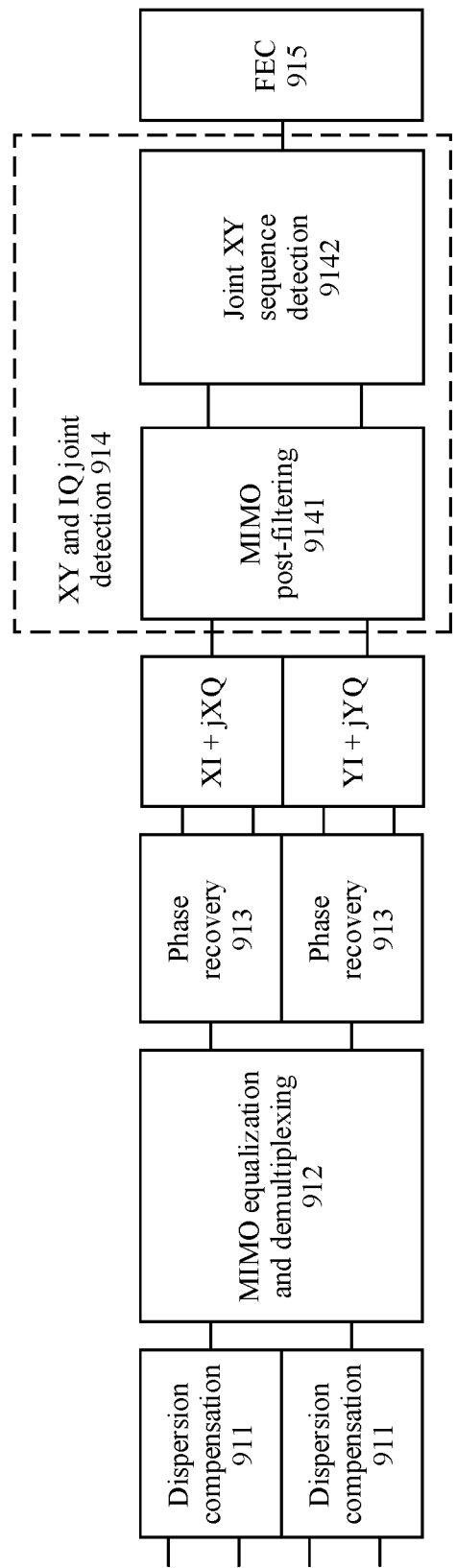
FIG. 9a is a schematic diagram of a logical structure of another RxDSP according to an embodiment of the present invention.

FIG. 9a is a schematic diagram of a logical structure of another RxDSP according to an embodiment of the present invention. If IQ is not independent due to a channel impairment (an asymmetric transfer function) in a channel, interference is generated to some extent between signals of a phase I and a phase Q, and XY and IQ joint detection shown in FIG. 9a may be used to improve system performance. Functions of dispersion compensation 911, MIMO equalization and demultiplexing 912, phase recovery 913, and FEC 915 in FIG. 9a are similar to those of the corresponding functional modules in FIG. 8a. A difference between FIG. 9a and FIG. 8a lies in that XY and IQ joint detection 914 is used to replace the XY joint detection 814. The XY and IQ joint detection 914 may include only one group of MIMO post-filtering 9141 and joint XY sequence detection 9142, and is used to jointly detect signals XI+jXQ and YI+jYQ.

Figure 9B:
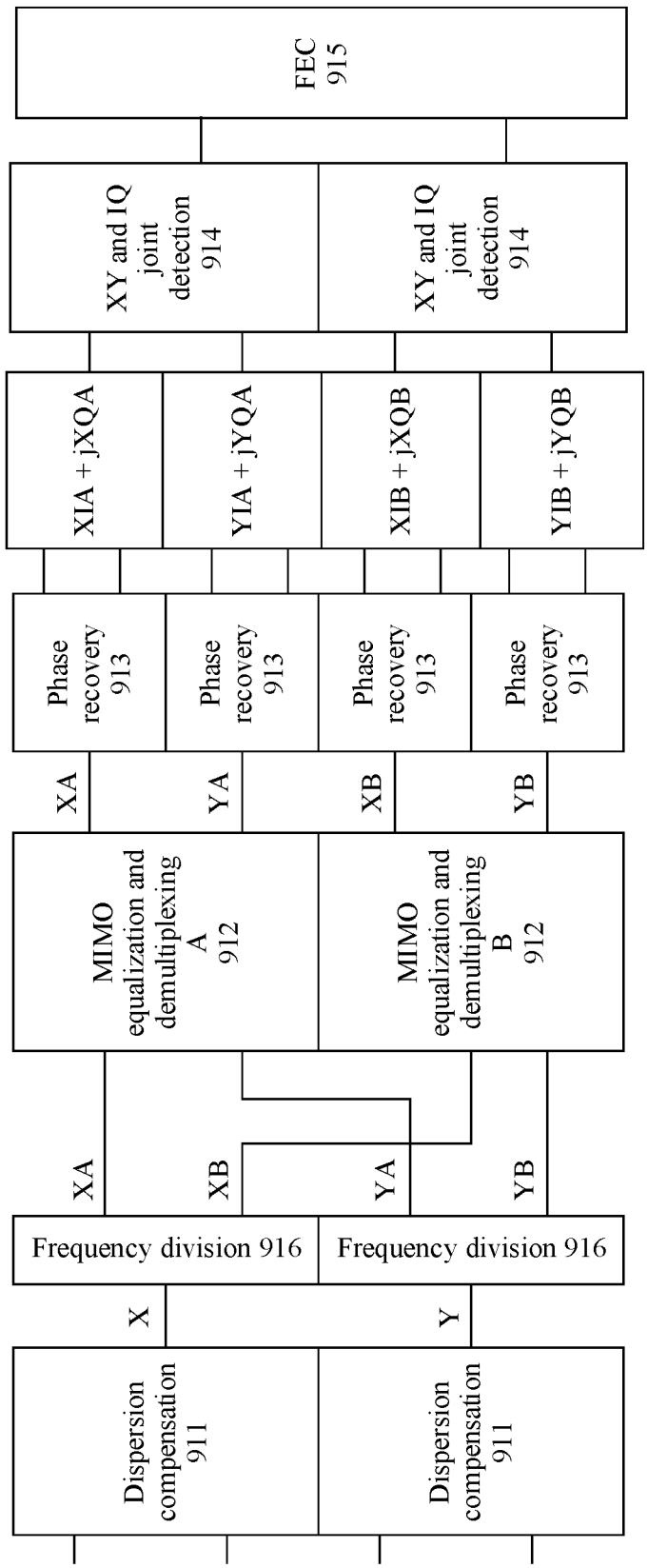
FIG. 9b is a schematic diagram of a logical structure of another RxDSP according to an embodiment of the present invention.

A technical solution in the embodiment in FIG. 9a may be applied to an optical communication system of a single subcarrier, and may be further applied to an optical communication system of two subcarriers or three or more subcarriers. FIG. 9b is a schematic diagram of a logical structure of another RxDSP according to an embodiment of the present invention. Two subcarriers are used as an example for description. A difference between FIG. 9b and FIG. 9a lies in that a signal obtained after the dispersion compensation 911 is performed is separated into two subcarrier signals, namely, a subcarrier A and a subcarrier B, by using a frequency divider 916. The subcarrier A may include subcarriers XA and YA, and the subcarrier B may include subcarriers XB and YB. The two subcarrier signals are separately processed in a manner similar to FIG. 9a, and processed by using two groups of MIMO equalization and demultiplexing 912, phase recovery 913, and XY and IQ joint detection 914 similar to those in FIG. 9a. Finally, the two subcarriers simultaneously enter the FEC 915 for decoding.

Figure 10A:
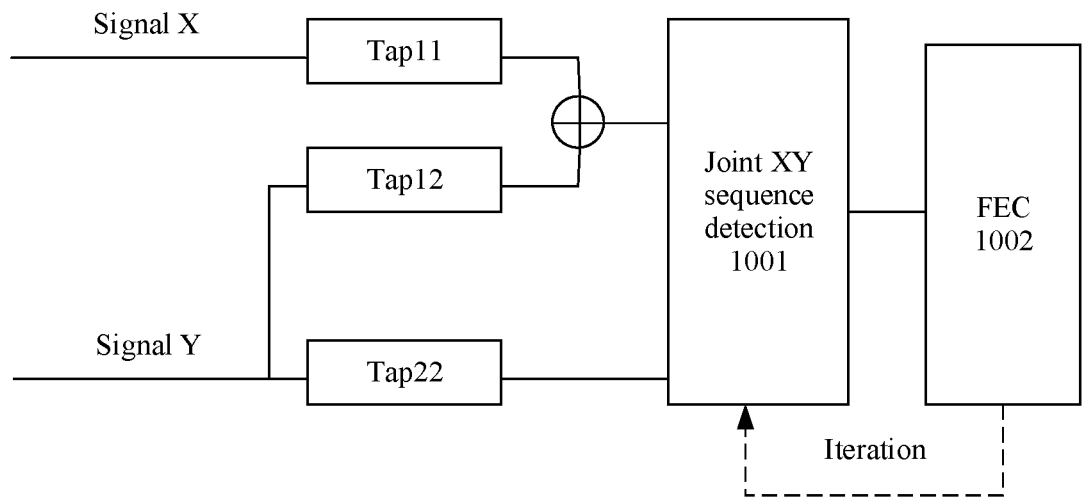
FIG. 10a is a schematic diagram of a logical structure of joint detection according to an embodiment of the present invention.

The XY joint detection 814 and the XY and IQ joint detection 914 are implemented in a plurality of manners. This embodiment of the present invention provides two equivalent possible implementations. FIG. 10a is a schematic diagram of a logical structure of joint detection according to an embodiment of the present invention. As shown in FIG. 10a, a signal X is filtered by using a filter of a coefficient Tap11, and a signal Y is filtered by using a filter of a coefficient Tap12. The signal X and the signal Y are summed to obtain a signal. The signal Y is filtered by using a filter of a coefficient Tap22 to obtain another signal. The two signals are input into joint XY sequence detection 1001 to improve performance. The joint XY sequence detection 1001 minimizes a joint Euclidean distance between a received sequence signal X and a received sequence signal Y and decision signals of the signal X and the signal Y, to implement sequence joint determining of the signal X and the signal Y, thereby improving performance. For example, after phase recovery, the signal X is RX0, and the signal Y is RY0. Two signals are obtained through MIMO post-filtering. FIG. 10a is used as an example. Two signals RX(k) and RY(k) that are output after the MIMO post-filtering is performed are:

$$RX(k)=\Sigma_{i=0}^{N-1}RX0(k+i)\text{Tap}11(N-i)+\Sigma_{i=0}^{N-1}RY0(k+i)\text{Tap}12(N-i) \text{ and}$$

$$RY(k)=\Sigma_{i=0}^{N-1}RY0(k+i)\text{Tap}22(N-i),$$

where k is a time sequence number, and N is a tap length of each of the filters of the Tap11, the Tap12, and the Tap22. The foregoing summation corresponds to a convolution operation, namely, filtering. The joint XY sequence detection obtains decision sequences of the signal X and the signal Y by minimizing a cost function $\Sigma_k(|RX(k)-\Sigma_{i=0}^{N-1}DX(k+i)\text{Tap}11(N-i)-\Sigma_{i=0}^{N-1}DY(k+i)\text{Tap}12(N-i)|^2+|RY(k)-\Sigma_{i=0}^{N-1}DY(k+i)\text{Tap}22(N-i)|^2)$. DX(k) and DY(k) are decisions of the signal X and the signal Y respectively. If the joint XY sequence detection 1001 and FEC 1002 employ soft value iteration, performance may be further improved.

Figure 10B:
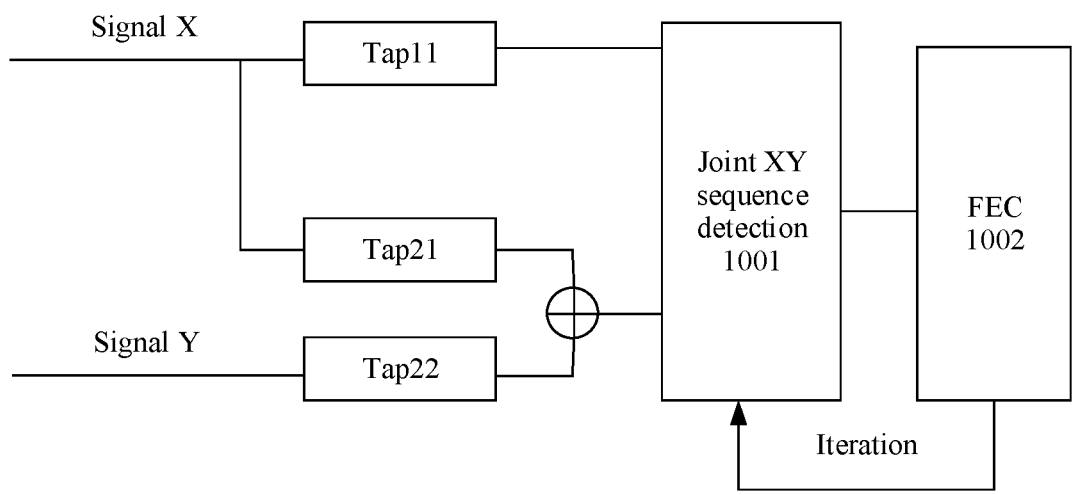
FIG. 10b is a schematic diagram of another logical structure of joint detection according to an embodiment of the present invention.

FIG. 10b is a schematic diagram of another logical structure of joint detection according to an embodiment of the present invention. As shown in FIG. 10b, a signal X is filtered by using a filter of a coefficient Tap21, and a signal Y is filtered by using a filter of a coefficient Tap22, and the signal X and the signal Y are summed to obtain a signal. The signal X is filtered by using a filter of a coefficient Tap11 to obtain another signal. The two signals are input into joint XY sequence detection 1001 to improve performance. In FIG. 10b, two signals RX(k) and RY(k) that are output after the MIMO post-filtering is performed are:

$$RX(k)=\Sigma_{i=0}^{N-1}RX0(k+i)\text{Tap}11(N-i) \text{ and}$$

$$RY(k)=+\Sigma_{i=0}^{N-1}RX0(k+i)\text{Tap}21(N-i)+\Sigma_{i=0}^{N-1}RY0(k+i)\text{Tap}22(N-i),$$

where k is a time sequence number, and N is a tap length of each of the filters of the Tap11, the Tap21, and the Tap22. The foregoing summation corresponds to a convolution operation, namely, filtering. The joint XY sequence detection obtains decision sequences of the signal X and the signal Y by minimizing a cost function $\Sigma_k$ (|RX(k)−$\Sigma_{i=0}^{N-1}$DX(k+i)Tap11(N−i)|$^2$+|RY(k)−$\Sigma_{i=0}^{N-1}$DX(k+i)Tap21(N−i)−$\Sigma_{i=0}^{N-1}$DY(k+i)Tap22(N−i)|$^2$). DX(k) and DY(k) are decisions of the signal X and the signal Y If the joint XY sequence detection 1001 and FEC 1002 employ soft value iteration, performance may be further improved. Each of the filters in FIG. 10a and FIG. 10b may be a finite impulse response (FIR) filter.

When the logical structures shown in FIG. 10a and FIG. 10b are used for XY joint detection, the signal X may include XI and XQ, and the signal Y may include YI and YQ. The XY joint detection may be performed on XI and YI by using the structure shown in FIG. 10a or FIG. 10b, and the XY joint detection may be performed on XQ and YQ by using the other structure shown in FIG. 10a or FIG. 10b. When the logical structures shown in FIG. 10a and FIG. 10b are used for XY and IQ joint detection, the signal X may be XI+jXQ, and the signal Y may be YI+jYQ. The XY and IQ joint detection may be performed on XI+jXQ and YI+jYQ by using the structure shown in FIG. 10a or FIG. 10b.

Figure 11:
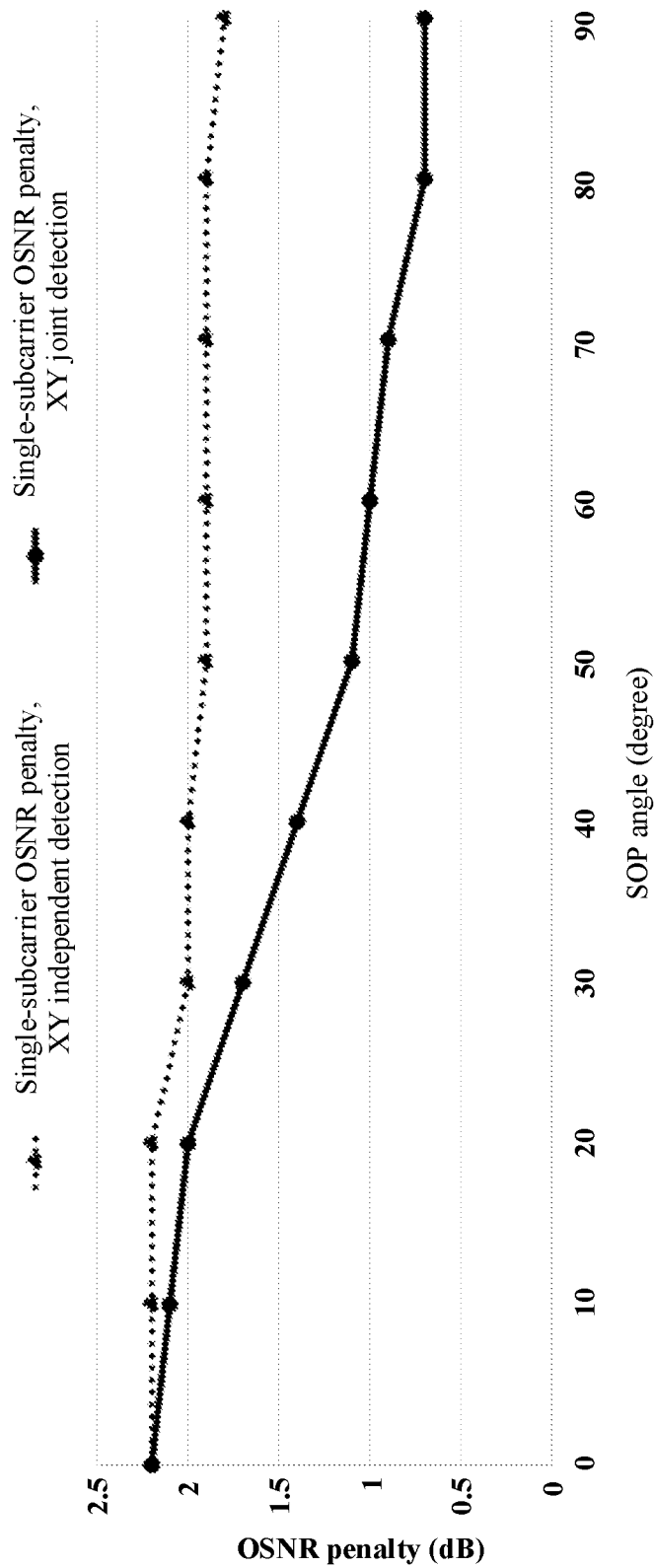
FIG. 11 is an OSNR penalty curve diagram of joint detection according to an embodiment of the present invention.
Figure 12:
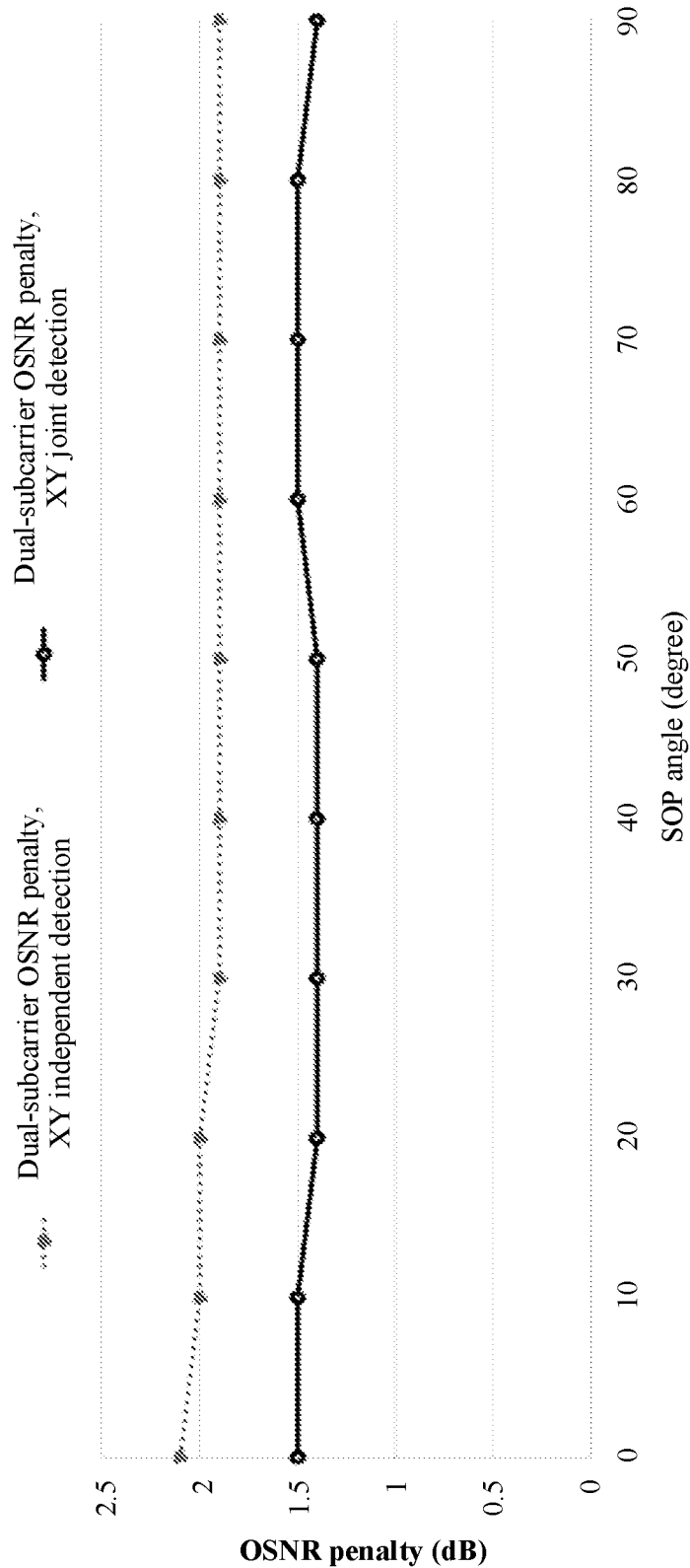
FIG. 12 is an OSNR penalty curve diagram of joint detection according to an embodiment of the present invention.

The following separately describes effects of joint detection used in a single-subcarrier scenario and a dual-subcarrier scenario. FIG. 11 is an OSNR penalty curve diagram of joint detection according to an embodiment of the present invention. As shown in FIG. 11, a solid line is an OSNR penalty curve for XY joint detection in the single-subcarrier scenario, and a dashed line is an OSNR penalty curve for XY independent detection in the single-subcarrier scenario. In the single-subcarrier scenario, a maximum OSNR penalty value remains unchanged when an SOP angle is zero; and the joint detection has no obvious gain compared with the independent detection, but OSNR penalty values of other SOP angles all decrease. FIG. 12 is an OSNR penalty curve diagram of joint detection according to an embodiment of the present invention. As shown in FIG. 12, a solid line is an OSNR penalty curve for XY joint detection in the dual-subcarrier scenario, and a dashed line is an OSNR penalty curve for XY independent detection in the dual-subcarrier scenario. In the dual-subcarrier scenario, the joint detection has a gain in any SOP angle compared with the independent detection, and system performance is improved.

Figure 13A:
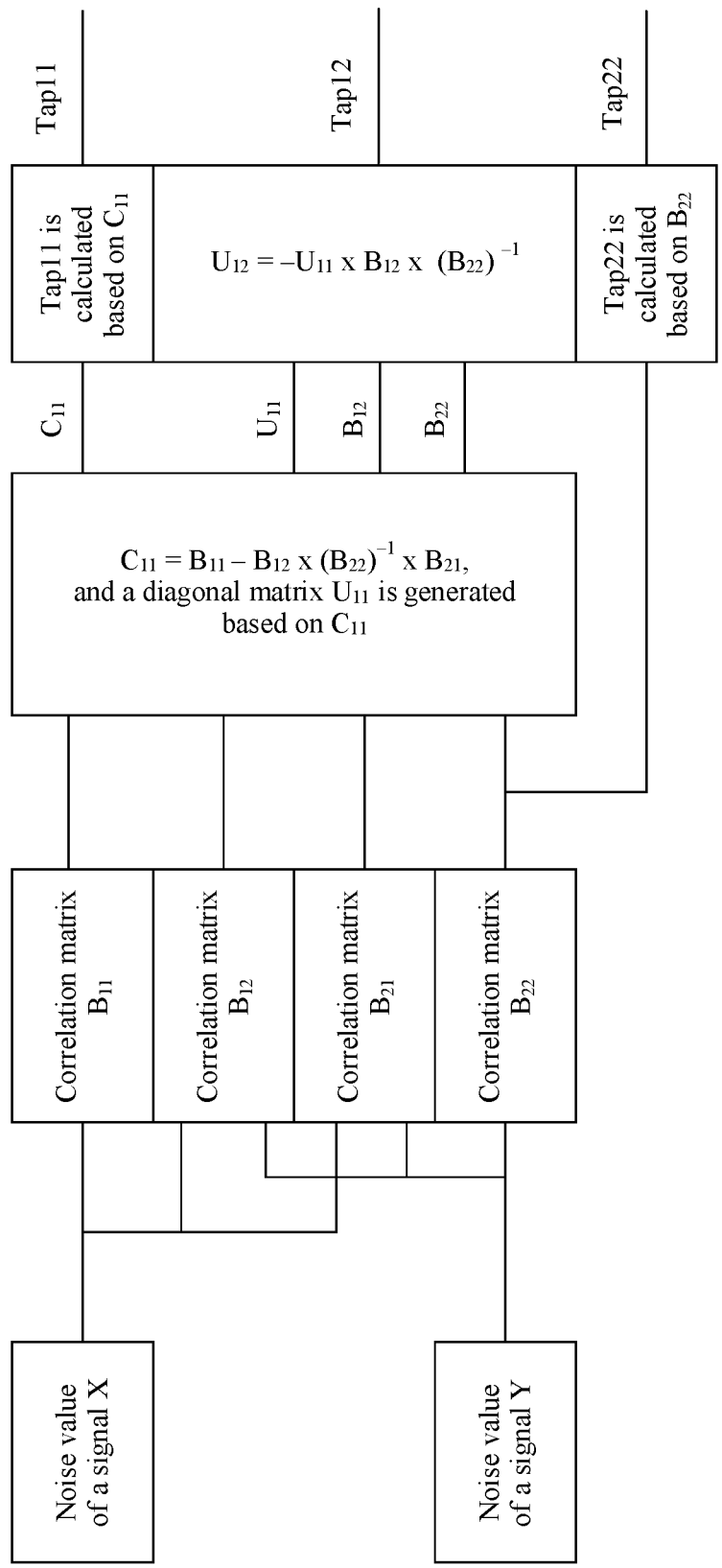
FIG. 13a is a schematic diagram of a logical structure of generating a filtering coefficient in joint detection according to an embodiment of the present invention.

FIG. 13a is a schematic diagram of a logical structure of generating a filtering coefficient in joint detection according to an embodiment of the present invention. As shown in FIG. 13a, calculation processes of filtering coefficients Tap11, Tap12, and Tap22 are described in detail by using XY joint detection and input signals XI and YI as an example.

If an output signal obtained after phase recovery 813 or 913 is performed is XI(k), where k is a time sequence number, an original sent signal corresponding to XI(k) is DXI(k). DXI(k) may come from original data (for example, a training sequence) of a known transmitter, or may come from a decision on XI(k). A noise value NoiseXI(k) of a signal X is equal to XI(k)−DXI(k). Similarly, if an output signal obtained after the phase recovery 813 or 913 is performed is YI(k), where k is a time sequence number, an original sent signal corresponding to the YI(k) is DYI(k). DYI(k) may come from the original data (for example, the training sequence) of the known transmitter, or may come from a decision on the YI(k). A noise value NoiseYI(k) of a signal Y is equal to YI(k)−DYI(k).

The following describes how to calculate Tap11, Tap12, and Tap22 by using NoiseXI(k) and NoiseYI(k). It is assumed that a tap length of each of the Tap11, the Tap12, and the Tap22 is N, and a matrix of L×L is calculated by using a correlation matrix, where L is a correlation delay length, and may be greater than or equal to N.

An autocorrelation matrix $B_{11}$ of NoiseXI(k) is as follows:

$$B_{11} = \begin{pmatrix} Rxx(0) & Rxx(1) & Rxx(2) & Rxx(L-1) \\ Rxx(-1) & Rxx(0) & Rxx(1) & \ldots & Rxx(L-2) \\ Rxx(-2) & Rxx(-1) & Rxx(0) & & Rxx(L-3) \\ \vdots & & & \ddots & \vdots \\ Rxx(-(L-1)) & Rxx(-(L-2)) & Rxx(-(L-3)) & \ldots & Rxx(0) \end{pmatrix}$$

Autocorrelation of NoiseXI(k) is Rxx(k)=$\Sigma_i$ NoiseXI(i)×(NoiseXI(i+k))*.

Because NoiseXI(k) is a real number, the foregoing expression may be simply denoted as $$B_{11} = \begin{pmatrix} Rxx(0) & Rxx(1) & Rxx(2) & Rxx(L-1) \\ Rxx(1) & Rxx(0) & Rxx(1) & \ldots & Rxx(L-2) \\ Rxx(2) & Rxx(1) & Rxx(0) & & Rxx(L-3) \\ \vdots & & & \ddots & \vdots \\ Rxx(L-1) & Rxx(L-2) & Rxx(L-3) & \ldots & Rxx(0) \end{pmatrix}$$

Similarly, an autocorrelation matrix of NoiseYI(k) is as follows:

$$B_{22} = \begin{pmatrix} Ryy(0) & Ryy(1) & Ryy(2) & Ryy(L-1) \\ Ryy(1) & Ryy(0) & Ryy(1) & \ldots & Ryy(L-2) \\ Ryy(2) & Ryy(1) & Ryy(0) & & Ryy(L-3) \\ \vdots & & & \ddots & \vdots \\ Ryy(L-1) & Ryy(L-2) & Ryy(L-3) & \ldots & Rxx(0) \end{pmatrix}$$

Autocorrelation of NoiseYI(k) is Ryy(k)=$\Sigma_i$ NoiseYI(i)×(NoiseYI(i+k))*.

A cross-correlation matrix of NoiseXI(k) and NoiseYI(k) is as follows:

$$B_{12} = \begin{pmatrix} Rxy(0) & Rxy(1) & Rxy(2) & Rxy(L-1) \\ Rxy(1) & Rxy(0) & Rxy(1) & \ldots & Rxy(L-2) \\ Rxy(2) & Rxy(1) & Rxy(0) & & Rxy(L-2) \\ \vdots & & & \ddots & \vdots \\ Rxy(L-1) & Rxy(L-2) & Rxy(L-3) & \ldots & Rxy(0) \end{pmatrix}$$

$B_{21} = B_{12}^H$

Cross-correlation of NoiseXI(k) and NoiseYI(k) is Rxy(k)=$\Sigma_i$ NoiseXI(i)×(NoiseYI(i+k))*. $B_{21}$ is a Hermitian matrix of $B_{12}$.

Similarly, because NoiseYI(k) is a real number, $B_{21} = B_{12}$ $C_{11}$ is obtained through calculation by using a matrix.

$C_{11} = B_{11} - B_{12} \times B_{22}^{-1} \times B_{21}$ $C_{11}$ is a self-conjugate matrix and may be written in the following form:

$$C_{11} = \begin{pmatrix} c_0 & c_1 & c_2 & & c_{L-1} \\ c_1 & c_0 & c_0 & \cdots & c_{L-2} \\ c_2 & c_1 & c_0 & & c_{L-3} \\ \vdots & & & \ddots & \vdots \\ c_{L-1} & c_{L-2} & c_{L-3} & \cdots & c_0 \end{pmatrix}$$

Tap11 is calculated based on $C_{11}$:

$$cn = c_0 - (c_1 \ c_2 \ \cdots \ c_N) \begin{pmatrix} c_0 & c_1 & c_2 & & c_{N-1} \\ c_1 & c_0 & c_0 & \cdots & c_{N-2} \\ c_2 & c_1 & c_0 & & c_{N-3} \\ \vdots & & & \ddots & \vdots \\ c_{N-1} & c_{N-2} & c_{N-3} & \cdots & c_0 \end{pmatrix}^{-1} \begin{pmatrix} c_1 \\ c_2 \\ \vdots \\ c_N \end{pmatrix}$$

$unn = 1/\sqrt{cn}$ $$u = -unn * (c_1 \ c_2 \ \cdots \ c_N) \begin{pmatrix} c_0 & c_1 & c_2 & & c_{N-1} \\ c_1 & c_0 & c_0 & \cdots & c_{N-2} \\ c_2 & c_1 & c_0 & & c_{N-3} \\ \vdots & & & \ddots & \vdots \\ c_{N-1} & c_{N-2} & c_{N-3} & \cdots & c_0 \end{pmatrix}^{-1}$$

$U = (unn \ u)$

U is represented as $U = (u_0 u_1 u_2 \ldots u_{N-1})$

U is Tap11.

Similar to a fact that Tap11 is calculated based on $C_{11}$, Tap22 is calculated based on $B_{22}$.

It can be learned based on U that $$U_{11} = \begin{pmatrix} u_0 & u_1 & u_2 & & u_{N-1} \\ u_1 & u_0 & u_1 & \cdots & u_{N-2} \\ u_2 & u_1 & u_0 & & u_{N-3} \\ \vdots & & & \ddots & \vdots \\ u_{N-1} & u_{N-2} & u_{N-3} & \cdots & u_0 \end{pmatrix}$$

Calculation is Performed $U_{12} = -U_{11} \times B_{12} \times B_{22}^{-1}$ $U_{12}$ is also a Hermitian matrix and may be written in the following form:

$$U_{12} = \begin{pmatrix} w_0 & w_1 & w_2 & & w_{L-1} \\ w_1 & w_0 & w_1 & \cdots & w_{L-2} \\ w_2 & w_1 & w_0 & & w_{L-3} \\ \vdots & & & \ddots & \vdots \\ w_{L-1} & w_{L-2} & w_{L-3} & \cdots & w_0 \end{pmatrix}$$

It is learned that Tap12 is:

$(w_0 w_1 \ldots w_{L-1})$

For the XY and IQ joint detection, input signals are X=XI+jXQ and Y=YI+jYQ. An output signal obtained after the phase recovery 813 or 913 is performed is X(k)=XI(k)+jXQ(k), where k is the time sequence number, an original sent signal corresponding to X(k) is DXI(k)+jDXQ(k), and DXI(k)+jDXQ(k) may come from original data (for example, the training sequence) of the known transmitter, or may come from a decision on X(k). A noise value NoiseX(k) of the signal X is equal to (XI(k)−DXI(k))+j(XQ(k)−DXQ(k)). Similarly, an output signal obtained after the phase recovery 813 or 913 is performed is Y(k)=YI(k)+jYQ(k), where k is the time sequence number, an original sent signal corresponding to Y(k) is DYI(k)+jDYQ(k), and DYI(k)+jDYQ(k) may come from original data (for example, the training sequence) of the known transmitter, or may come from a decision on Y(k). A noise value NoiseY(k) of the signal Y is equal to (YI(k)−DYI(k))+j(YQ(k)−DYQ(k)). Similar to the foregoing XY joint detection process, a partial correlation function in the correlation matrix may be changed to a complex number.

Figure 13B:
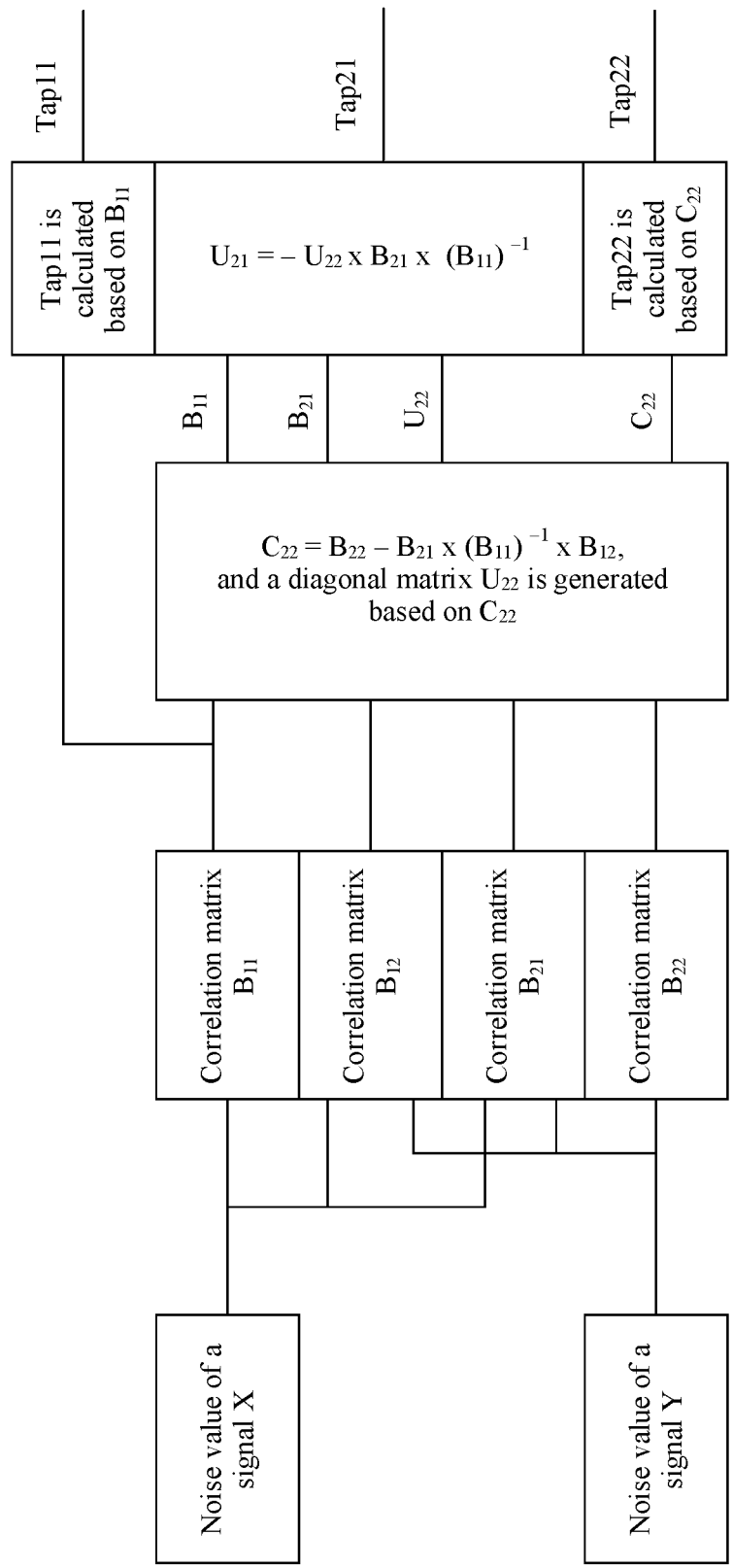
FIG. 13b is a schematic diagram of another logical structure of generating a filtering coefficient in joint detection according to an embodiment of the present invention.

FIG. 13b is a schematic diagram of another logical structure of generating a filtering coefficient in joint detection according to an embodiment of the present invention. An implementation in FIG. 13b is similar to that in FIG. 13a. The noise value of the signal X input in FIG. 13a and the noise value of the signal Y may be exchanged for positions to obtain the implementation in FIG. 13b, and details are not described herein again.

All or some of the foregoing embodiments may be implemented by using software, hardware, firmware, or any combination thereof. When software is used to implement the embodiments, the embodiments may be implemented entirely or partially in a form of a program product. The program product includes one or more instructions. When the program instructions are loaded and executed on an optical transceiver, the procedures or functions according to the embodiments of the present invention are all or partially generated. The optical transceiver may be an optical module, and has an optical sending function or an optical receiving function, or may have both optical sending and receiving functions. The instructions may be stored in a readable storage medium or transmitted from a readable storage medium of one device to a readable storage medium of another device. The readable storage medium may be any usable medium accessible by the optical transceiver, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending a signal in optical communication, wherein the method comprises:
   generating, by an optical transmitter, a plurality of first subcarriers based on a bit stream;
   performing, by the optical transmitter, state of polarization (SOP) rotation on at least one subcarrier in the plurality of first subcarriers to generate a plurality of second subcarriers, wherein the plurality of second subcarriers comprise a plurality of subcarriers with a relative SOP rotation angle, and the relative SOP rotation angle between the plurality of subcarriers in the generated plurality of second subcarriers is not zero and is not an integer multiple of 90 degrees;
   modulating, by the optical transmitter, the plurality of second subcarriers to an optical signal; and sending, by the optical transmitter, the modulated optical signal.

2. The method according to claim 1, wherein the relative SOP rotation angle is 45 degrees.

3. The method according to claim 1, wherein performing the SOP rotation on the at least one subcarrier in the plurality of first subcarriers comprises:

performing the SOP rotation on one subcarrier in the plurality of first subcarriers according to $$\begin{bmatrix} Xout \\ Yout \end{bmatrix} = \begin{bmatrix} \cos\alpha & \sin\alpha \\ -\sin\alpha & \cos\alpha \end{bmatrix} \begin{bmatrix} Xin \\ Yin \end{bmatrix},$$

wherein Xin and Yin represent a subcarrier obtained before the SOP rotation is performed, Xout and Yout represent a subcarrier obtained after the SOP rotation is performed, and α represents the relative SOP rotation angle.

4. The method according to claim 1, wherein the method further comprises:

after performing the SOP rotation, performing, by the optical transmitter, spectrum shifting on the plurality of second subcarriers;

wherein modulating the plurality of second subcarriers to the optical signal comprises:

modulating, by the optical transmitter, the plurality of second subcarriers after performing spectrum shifting to the optical signal.

5. The method according to claim 1, wherein the method further comprises:

before performing the SOP rotation, performing, by the optical transmitter, spectrum shifting on the plurality of first subcarriers;

wherein performing SOP rotation on the at least one subcarrier in the plurality of first subcarriers comprises:

performing SOP rotation on the at least one subcarrier in the plurality of first subcarriers after performing spectrum shifting.

6. The method according to claim 4, wherein the method further comprises:

multiplexing, by the optical transmitter, the plurality of second subcarriers after performing spectrum shifting.

7. The method according to claim 5, wherein the method further comprises:

multiplexing, by the optical transmitter, the plurality of first subcarriers after performing spectrum shifting.

8. An optical transmitter, wherein the optical transmitter comprises a digital signal processor (DSP) and a modulator, and wherein:

the DSP is configured to generate a plurality of first subcarriers based on a bit stream;

the DSP is configured to perform state of polarization (SOP) rotation on at least one subcarrier in the plurality of first subcarriers to generate a plurality of second subcarriers, wherein the plurality of second subcarriers comprise a plurality of subcarriers with a relative SOP rotation angle, and the relative SOP rotation angle between the plurality of subcarriers in the generated plurality of second subcarriers is not zero and is not an integer multiple of 90 degrees; and the modulator is configured to modulate the plurality of second subcarriers to an optical signal, and send the modulated optical signal.

9. The optical transmitter according to claim 8, wherein the relative SOP rotation angle is 45 degrees.

10. The optical transmitter according to claim 8, wherein performing the SOP rotation on the at least one subcarrier in the plurality of first subcarriers comprises: performing the SOP rotation on one subcarrier in the plurality of first subcarriers according to $$\begin{bmatrix} Xout \\ Yout \end{bmatrix} = \begin{bmatrix} \cos\alpha & \sin\alpha \\ -\sin\alpha & \cos\alpha \end{bmatrix} \begin{bmatrix} Xin \\ Yin \end{bmatrix},$$

wherein Xin and Yin represent a subcarrier obtained before the SOP rotation is performed, Xout and Yout represent a subcarrier obtained after the SOP rotation is performed, and α represents the relative SOP rotation angle.

11. The optical transmitter according to claim 8, wherein the DSP is further configured to:

after performing the SOP rotation, perform spectrum shifting on the plurality of second subcarriers;

wherein the modulator is configured to:

modulating the plurality of second subcarriers after performing spectrum shifting to the optical signal.

12. The optical transmitter according to claim 8, wherein the DSP is further configured to:

before performing the SOP rotation, perform spectrum shifting on the plurality of first subcarriers;

wherein the DSP is configured to:

performing SOP rotation on the at least one subcarrier in the plurality of first subcarriers after performing spectrum shifting.

13. The optical transmitter according to claim 11, wherein the DSP is further configured to:

multiplex the plurality of second subcarriers after performing spectrum shifting.

14. The optical transmitter according to claim 12, wherein the DSP is further configured to:

multiplex the plurality of first subcarriers after performing spectrum shifting.

15. An optical communication system, wherein the optical communication system comprises an optical transmitter and an optical receiver, wherein the optical transmitter comprises a digital signal processor (DSP) and a modulator, and wherein:

the DSP is configured to generate a plurality of first subcarriers based on a bit stream;

the DSP is configured to perform state of polarization (SOP) rotation on at least one subcarrier in the plurality of first subcarriers to generate a plurality of second subcarriers, wherein the plurality of second subcarriers comprise a plurality of subcarriers with a relative SOP rotation angle, and the relative SOP rotation angle between the plurality of subcarriers in the generated plurality of second subcarriers is not zero and is not an integer multiple of 90 degrees; and the modulator is configured to modulate the plurality of second subcarriers to an optical signal, and send the modulated optical signal.

16. The optical communication system according to claim 15, wherein the relative SOP rotation angle is 45 degrees.

17. The optical communication system according to claim 15, wherein performing the SOP rotation on the at least one subcarrier in the plurality of first subcarriers comprises: performing the SOP rotation on one subcarrier in the plurality of first subcarriers according to $$\begin{bmatrix} Xout \\ Yout \end{bmatrix} = \begin{bmatrix} \cos\alpha & \sin\alpha \\ -\sin\alpha & \cos\alpha \end{bmatrix} \begin{bmatrix} Xin \\ Yin \end{bmatrix},$$

wherein Xin and Yin represent a subcarrier obtained before the SOP rotation is performed, Xout and Yout represent a subcarrier obtained after the SOP rotation is performed, and α represents the relative SOP rotation angle.

18. The optical communication system according to claim 15, wherein the DSP is further configured to:
   after performing the SOP rotation, perform spectrum shifting on the plurality of second subcarriers; wherein the modulator is configured to:
   modulating the plurality of second subcarriers after performing spectrum shifting to the optical signal.

19. The optical communication system according to claim 15, wherein the DSP is further configured to:
   before performing the SOP rotation, perform spectrum shifting on the plurality of first subcarriers;
   wherein the DSP is configured to:
   performing SOP rotation on the at least one subcarrier in the plurality of first subcarriers after performing spectrum shifting.

20. The optical communication system according to claim 18, wherein the DSP is further configured to:
   multiplex the plurality of second subcarriers after performing spectrum shifting.

\* \* \* \* \*